Nov. 7, 1933. E. G. DESNOYERS ET AL 1,934,047
METHOD OF MAKING DECORATED TUBULAR OBJECTS
Filed July 22, 1931
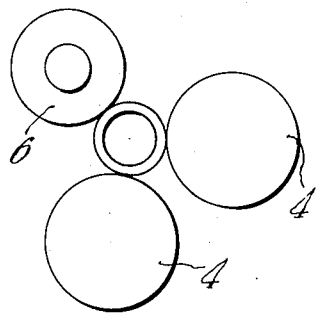
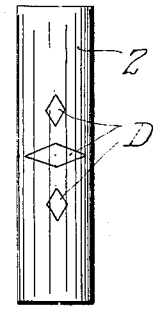
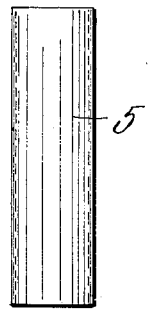
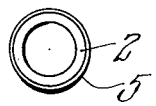
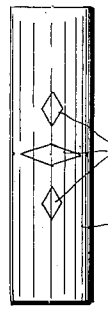
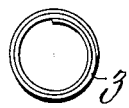
Inventor
EMERY. G. DESNOYERS.
HERBERT. C. NIMS.
BY
ATTORNEY.

Patented Nov. 7, 1933

1,934,047

UNITED STATES PATENT OFFICE 1,934,047

METHOD OF MAKING DECORATED TUBULAR OBJECTS

Emery G. Desnoyers, West Springfield, and Herbert E. Nims, Springfield, Mass., assignors to The Fiberloid Corporation, Indian Orchard, Mass., a corporation of Massachusetts Application July 22, 1931. Serial No. 552,412

2 Claims. (Cl. 41—22)

This invention relates to improvements in the method of making decorated cylindrical objects such as rods, tubes and the like.

The principal objects of the invention are directed to the provision of improvements in the methods of making rods, tubes and the like from plastic materials which are ornamented with designs, so as to be suitable for use in fountain pen construction and the like. This is accomplished by providing an inner core member which is ornamented with designs of various forms and which is enclosed in a transparent or translucent tubular sheath member. In this way the core may be decorated or ornamented in various ways and the ornamentations protected.

It has been the practise to make tubes and rods for fountain pens and the like from cellulose-ester materals and to obtain ornamental effects the material from which the rods are made is variegated or mottled. In this way the designs for the finished rods and tubes have been limited more or less to unsymmetrical and non-geometric effects. It has been attempted to build up members for fountain pen barrels and tubes which carry predetermined symmetrical and geometrical designs by wrapping a previously ornamented sheet or strip of cellulose ester material about a mandrel or support.

While such a procedure has made it possible in a general way to obtain geometrical or overall designs, the results have not been satisfactory due to variations in the thickness of the sheets relative to the diameter of the mandrel. In such a case there results inaccurate wrapping so as to cause the elements of the design to be improperly or inaccurately positioned relative to one another. This impairs the symmetrical overall effect desired. Furthermore the outer end of the sheet must be smoothed off after the wrapping to provide a tube having a smooth outer surface while the sheet tends to unwind through lack of adhesion between the layers of the material, all of which is objectionable.

According to the novel features of this invention an inner core of plastic material such as cellulose-ester in the form of a tube or rod may be ornamented or decorated with various predetermined overall designs and a protective, transparent or translucent sheath or tube of plastic material is applied thereto. In this way it is not only possible to apply overall and predetermined designs of a symmetrical or geometric character to the core in such a way that the elements of the design are in proper relation around the core, but the design is protected by the sheath without in any way impairing the design effect.

Various novel features and advantages of the invention will be more fully hereinafter referred to in connection with the accompanying description of the preferred form thereof, taken in connection with the accompanying drawing wherein.

Fig. 1 is an end elevational view of one form of an apparatus for applying designs to the outer surface of a core element.

Fig. 2 is a plan view of a core element having a design applied thereto.

Fig. 3 is a plan view of a sheath tube used in association with the core shown in Fig. 2.

Fig. 4 is a plan view of a core having a sheet applied thereto.

Fig. 5 is an end elevational view of the same, and

Fig. 6 is an end elevational view of another form of core.

Referring now to the drawing in detail the invention will be fully described.

In carrying out the invention a core 2 in the form of a rod or tube is provided which may be of any cross sectional dimensions and of any desired length. This core 2 is preferably of plastic material such as cellulose-ester. For instance, cellulose acetate and cellulose nitrate are suitable for the purpose. The outer surface of the core is decorated or ornamented with designs of various kinds as may be desired.

The designs may be applied to the core in various ways, but in one way may be readily applied by rotatably supporting the core 2 on supporting rolls 4 and contacting therewith a rotatable design-roll 6. The roll 6 may carry design-applying elements which bear on the core and may be supplied with coloring material so that as the core is rotated a design D such as shown in Fig. 2 is applied to the surface thereof. Before the design applying step, according to the invention, the core will be accurately sized in some suitable manner as by grinding. This may be done readily when the core is made from cellulose-ester material.

Cellulose-ester material may be decorated readily by engraving, embossing, inlaying, etching, printing and other usual ways so that a complete design extends therearound. Thus with the complete design having its elements properly disposed the core is suitable for use in connection with fountain-pen manufacturer or whenever decorated tubes or rods are desired.

The core 2 in Figs. 1, 2, 4 and 5 has a solid wall, but according to a modification of the invention shown in Fig. 6, a core 3 may be made by winding a sheet or a strip of cellulose-ester material about a mandrel to provide overlying layers forming a tube having a laminated wall. Such a core is readily formed by winding the sheet or strip on a mandrel of proper size and when desired the overlying plies of material may be adhesively secured together in some suitable manner.

This core 3, as in the former case, may be decorated or ornamented in any suitable manner and by the means of any apparatus adapted for the purpose, but, as in the former case, the core may be supported on the supporting rolls 4 and acted upon by the other roll 6 so as to have a design applied thereto after the manner already described in connection with Figs. 1 and 2.

With the core provided with surface ornamentation in some suitable manner, a sheath 5 of tubular form, as shown in Fig. 3, is slipped over the core 2. Such a sheath will preferably be made from transparent material, such as cellulose-ester and will have relatively thin walls. The sheath will preferably be a "push fit" on the core and, when in place, the assembled core and sheath are placed in a steam jacket for shrinking the sheath. The outer surface of the core will preferably be softened before the sheath is slipped thereover. This may be done by applying cement to the core and will serve to secure the sheath to the core as well as to soften the surface of the core. When the sheath is placed on the core and the whole subjected to the proper shrinking and subsequent drying or otherwise conditioning operations, the core and sheath are substantially integral and provide a rigid unitary structure, consisting of an inner core having a decorated surface and an outer protecting sheath.

The outer surface of the sheath may be ground and polished to obtain the desired finish which of course does not affect the ornamentation.

When the modified form of core 3 is employed, the outer sheath serves as a retaining means for the core in that the overlying layers forming the core are held against any unwinding tendency and, by being secured thereto, the sheath and core form a strong and durable structure.

According to a special feature of the invention the core member may be made from cellulose-nitrate, while the sheath member may be made from cellulose-acetate. This is not necessary in all cases, but may be desirable for the reason that the cellulose nitrate material may be said to be relatively inexpensive as compared with the cellulose acetate. Thus with an inexpensive core member it is possible to produce tubes and rods at a low cost which have the decorative features protected in the novel way. Also since cellulose nitrate is more or less inflammable and cellulose acetate is not, the core and its design are amply protected, making the finished product less inflammable.

According to another form of the invention the ornamented core may be dipped in a lacquer or the like which may consist of a solution of cellulose acetate in acetone so that a coating to form a sheath is deposited on the core. The coating material may be of any desired consistency and the core may be dipped therein any desired number of times to form a sheath of the required thickness. The coating may well be applied, in lieu of the dipping described, by spraying, brushing or any other convenient method.

The coating material may be translucent or transparent and may be tinted if desired. Likewise the sheath shown in Fig. 3 may be transparent or translucent and may be colored.

From the foregoing it will be observed that it is possible to apply a design to the core which is composed of geometric or symmetrical elements which may vary within extremely wide limits. By properly sizing the core prior to the decorating step, the elements of any overall design may be applied thereto in accurate relation which of course is always desirable for the most artistic ornamental effects.

It will also be observed that by providing the protective sheath or outer shell for the core that the design is protected and its effect more or less enhanched by the transparent sheath. In some cases the core may be of a certain color with the design applied thereto in one or more different colors, while the sheath may be tinted or colored so that the design effect may be enhanced and beautified.

The structure as described is well adapted for the manufacture of barrels and caps for fountain pens, pencils and similar articles, but may as well be used for many and various other purposes where cylindrical rods and tubes having decorative surfaces are desired. Therefore it is not desired to be limited by the foregoing description of the preferred form of the invention, but rather, if at all, by the following claims, which set forth the invention in the form at present preferred.

What is claimed is:

1. The method of making casings for fountain pens and the like which comprises, decorating the outer surface of a core of plastic material with a design, softening said surface, forcing a seamless tubular sheath member of relatively transparent material capable of shrinking after the action of heat over said core, said last named material having its surface softened and then subjecting the same to heat to cause a shrinkage and thereby make the core and sheath integral.

2. The method of making casings for fountain pens and the like which comprises, printing the outer surface of a core of cellulose-ester material with a design, applying a softening agent to said surface, forcing a seamless tubular sheath member of relatively transparent cellulose material capable of shrinking under the action of heat over said core said last named material softenable by the said softening agent and then subjecting the same to heat to cause a shrinkage thereby making the core and sheath united to provide an integral structure.

EMERY G. DESNOYERS.
HERBERT E. NIMS.